Figure 1:
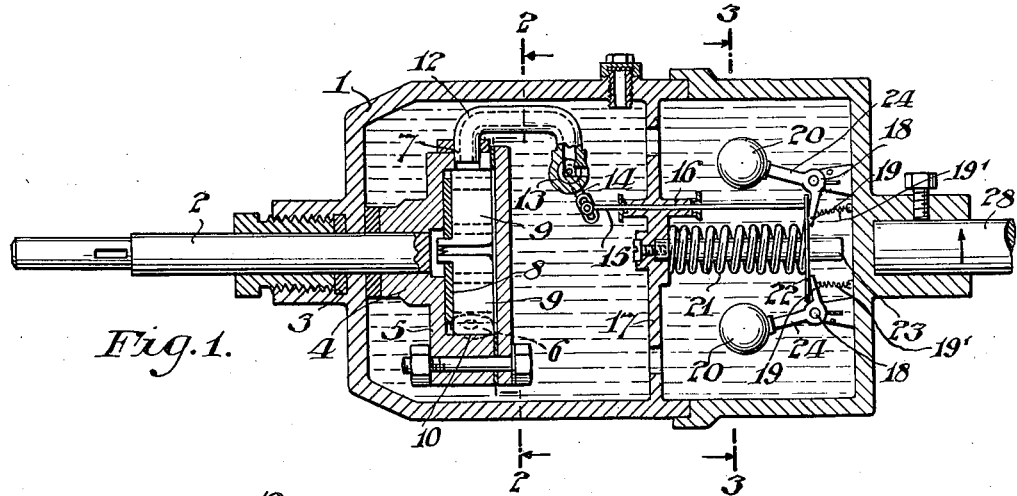

March 24, 1936.   J. McCLELLAND   2,034,702
SLIP COUPLING
Filed Aug. 1, 1931

Inventor:
John McClelland,
By
Attorney.

Patented Mar. 24, 1936

2,034,702

UNITED STATES PATENT OFFICE 2,034,702

SLIP COUPLING

John McClelland, Philadelphia, Pa., assignor of one-half to J. Alexander Kline, Philadelphia, Pa.

Application August 1, 1931, Serial No. 554,592

2 Claims. (Cl. 192—58)

My invention is an improved coupling whereby a driving member actuates a driven member through fluid pump mechanism having a casing connected with one of said members and a piston connected with the other of said members, the flow through the pump being regulated to control the relative movements of piston and cylinder and vary the slippage and rate of speed of the driven member relatively to the driving member. All of the operative parts may be constantly immersed in a lubricant to minimize friction and wear and serving as the fluid to be pumped.

My invention is particularly adapted for driving an electric generator at a constant rate from a prime mover, such as an automobile or aviation engine, which operates at a varying rate. By thus driving the generator at a constant rate I am enabled to secure a current output suitable for direct connection with a radio set for effecting the operation thereof independently of variations in the speed of the engine.

In its preferred form, my invention comprises a fluid container disposed between the driving member and the driven member and containing non-corrosive fluid which is preferably a lubricant, a brake fluid, or the like. The container communicates with inlet and outlet ports of a pump cylinder connected with one of the members and housing a piston connected with the other of the members. The flow through the pump is controlled by the rate of movement of the driven member and preferably by a valve actuated by a centrifugal governor rotated by one of the members. When the valve is fully open, the piston operates freely to pump the fluid from and to the fluid container and there is no thrust communicated from the piston through the fluid and casing to drive the driven member. When, however, the discharge from the pump is retarded or stopped by partially or fully closing the outlet port, the piston transmits thrust through the substantially incompressible fluid to the pump cylinder and therefrom mediately or immediately to the driven member, which is actuated thereby at a rate of speed proportioned to the pressure on the fluid in the casing.

As the outlet port is varied with the speed, the pressure on the fluid in the pump casing is maintained substantially constant regardless of the rate of movement of the driving member, and hence constant speed is given to the driven member. The pump piston may be of either a rotary or reciprocating type, such for instance as found in centrifugal, rotary, gear or reciprocating piston pumps.

The characteristic features and advantages of my improvements further appear from the following description and the accompanying drawing of illustrative embodiments thereof.

Figure 2:
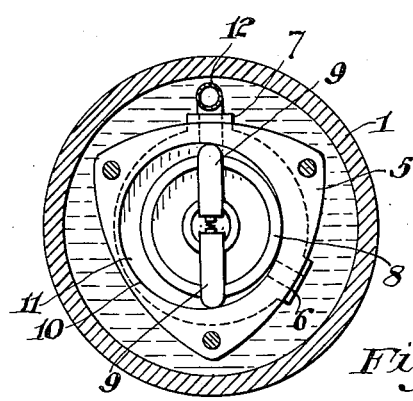
Figure 3:
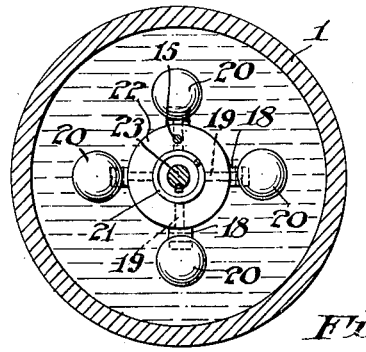
Figure 4:
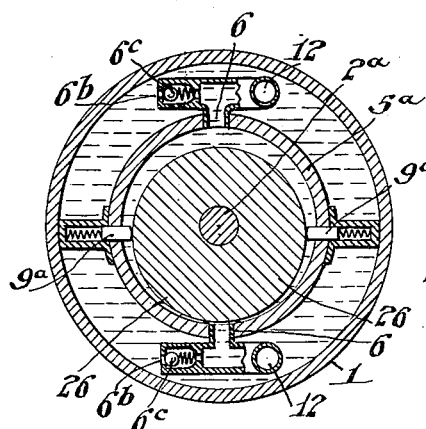
Figure 5:
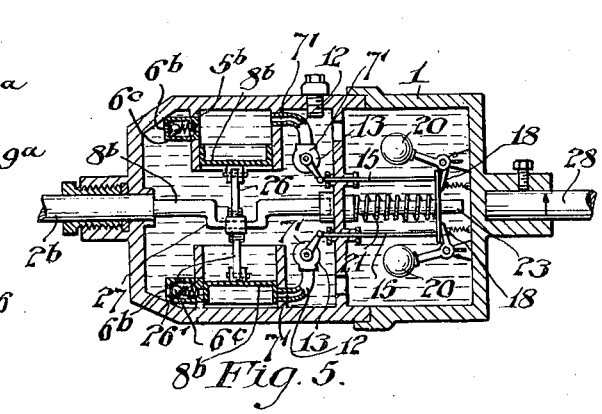

In the drawing, Fig. 1 is a longitudinal sectional view of a coupling mechanism embodying one form of my improvements; Fig. 2 is a transverse sectional view on the line 2—2 of Fig. 1; Fig. 3 is a transverse sectional view on the line 3—3 of Fig. 1; Fig. 4 is a detached fragmentary view illustrating the use of a modified form of pump mechanism in the casing shown in Figs. 1-3; and Fig. 5 is a longitudinal sectional view of a further modification illustrating a further type of pump mechanism.

As illustrated in Figs. 1 to 3, a fluid container 1 is sleeved on a driving shaft 2 connected with a prime mover (not shown). The shaft 2 passes through the packed bearing 3 into the interior of the container 1 and through the bearing 4 of a pump casing 5 fixed to the inner wall of the container 1. The pump casing has an inlet port 6 and an outlet port 7 communicating with the interior of the container 1. A rotary piston 8 is fixed on the end of and driven by the shaft 2 within the pump casing 5, and is provided with the outwardly spring pressed vanes 9 which contact with the eccentric inner surface 10 of the pump chamber 11. It will be understood that the rotation of the rotary piston draws into the chamber 11 oil or other suitable liquid from the container 1 through the inlet 6 and forces it out under pressure through the outlet 7, which discharges back to the interior of the container 1 through the tube 12.

The discharge through the port 7 and tube 12 is controlled by a rotary valve 13 having an arm 14 operable through a pin and slot connection by the rod 15 reciprocable in the bearing 16 of the web 17. The end of the rod 15 is fixed to a disk 22 splined on the adjustable rod 23. The disk 22 is pressed by a spring 21 coiled on the rod 23 so as to normally move the disk toward the right (Fig. 1) and close the valve 13. Centrifugal governor weights 20 are fixed on the arms 24 of bell cranks fulcrumed on the pivots 18 and having arms 19 pressed against the plate 22 when the weights 20 are moved outward upon rotation thereof. The spring 19' may be provided to supplement the action of the spring 21 in drawing the balls toward the axis of the casing when at rest.

As shown in Fig. 4 the vanes 9a are seated in slots in the pump casing 5a fixed to the casing 1 and are spring pressed outwardly against the eccentric periphery of the rotary piston 26 mounted on a shaft 2a.

The upper and lower compartments formed in the pump casing by the vanes 9a each communicate with the interior of the casing 1 through ports 6. Fittings are seated in the respective ports 6 and provided with discharge tubes 12, controlled by valves 13, as illustrated in Figs. 1 and 5, and also provided with inlet ports 6b controlled by spring pressed ball valves 6c.

As illustrated in Fig. 5, cylindrical pump casings 5b are fixed to the container 1 and communicate with the interior thereof through the inlet ports 6b controlled by ball check valves 6c and through outlet ports 7'. Pistons 8b are reciprocable in the cylinders by arms 26, 26' connected with the crank 27 formed in the shaft 2b.

The ports 7' discharge through tubes 12 controlled by valves 13 and the governor mechanism previously described.

In operation, the container 1 is filled with oil or other suitable liquid for transmitting pressure and minimizing friction and wear; the springs 21 and 19' having such tension as to properly position and control the governor.

When the driving member in Fig. 1 is operating at the desired rate of speed for the driven member 28, the balls 20 are held retracted toward the axis of the shaft and the oil outlet valve 13 from the pump casing 5 is closed so that the action of the piston 8 on the liquid freely admitted to the pump casing through the inlet port 6 transmits a driving force to the pump casing and therefrom to the container 1, which is fixed to the driven member 28, such as the shaft of a generator. When, however, the prime mover driven shaft 2 rotates at a speed in excess of that desired for the member 28, the balls 20 are thrown outward and shift the valve control rod 15 longitudinally to slightly open the valve 13 so that a portion of the liquid or oil is discharged.

Consequently the pressure on the liquid within the pump remains the same notwithstanding the increased number of piston impulses, and hence the force transmitted to the pump casing and therethrough to the container 1 and shaft 28 remains uniform.

As the rate of speed of the prime mover increases, the valve 13 is opened further and further so as to maintain a constant rate of speed on the generator shaft.

When the driving shaft is idling or at a minimum speed, the coupling is so adjusted as to operate the driven shaft at the same speed. This speed is ordinarily sufficient to provide satisfactory operation of a radio apparatus connected to a generator fixed to the driven shaft. When the driving shaft is speeded up in driving, flying or otherwise, to a point beyond that desired for the driven shaft, the rotation of the driven shaft will not increase beyond that desired due to the maintenance of a constant pressure on the liquid in the pump casing after the speed has reached the desired limit for the driven shaft.

As illustrated in Fig. 4, the rotation of the eccentric piston 26 tends to alternately draw liquid into and expel liquid from the upper and lower compartments formed by the vanes 9', when the valves corresponding to valves 13 in Fig. 5 are opened. When, however, the valves 13 are closed, the piston sucks liquid into the pump casing through the ports 6b, and since such liquid cannot escape through the tubes 12 or through the ports 6b pressure is transmitted from the piston through the liquid to the pump casing to cause the rotation of the casing 1 at a constant rate due to the maintenance of a constant pressure on the liquid in the pump cylinder by the opening and closing of the valves 13 by the centrifugal governor mechanism shown in Figs. 1 and 5.

In the form of the invention shown in Fig. 5, the pump cylinders 5b are fixed to the casing 1 and the pistons 8b are reciprocable therein by the eccentrics 27 and links 26 and 26' when the valves 13 are opened. When, however, the casing 1 is rotated at a desired rate of speed, the springs 21 and 19' retract the centrifugal governor mechanisms so that the rods 15 shift the valves 13 to closed position and prevent discharge of liquid from the pump cylinders. The ports 6b and check valves 6c permit liquid to be drawn into the pump cylinders but prevent expulsion of liquid from the pump cylinders, hence, when the valves 13 are wholly or partially closed pressure is exerted by the piston on the liquid confined in the cylinder so as to transmit a uniform force to the casing 1, which is consequently rotated at a uniform rate of speed.

Having described my invention, I claim:

1. A coupling mechanism comprising a liquid-tight housing, a shaft fixed to one end of said housing, a shaft journalled in the other end of said housing, a coiled spring in said housing having an axis co-axial with the axes of said shafts, centrifugal mechanism operable by said spring, an apertured web fixed in said housing transversely to said shafts and sustaining the thrust of said spring at the end opposite said centrifugal mechanism, a pump casing within said housing and having a port, a valve for said port controlled by said spring and centrifugal mechanism, a rod extending from said centrifugal mechanism at one side of said spring and parallel to the axis thereof for transmitting motion between said mechanism and said valve and guided in said web, and a piston within said pump casing and connected with said journalled shaft.

2. A coupling mechanism comprising a liquid-tight housing, a shaft fixed to one end of said housing, a shaft journalled in the other end of said housing, an apertured web fixed in said housing transverse to the axes of said shafts, a coiled spring in said housing having an axis coaxial with the axes of said shafts and abutting said web, a rod fixed to said web and extending on one side thereof through the center of said spring, a plate slidably mounted on said rod transverse thereto and against which said spring is arranged to thrust, centrifugal mechanism carried within said housing and arranged to act on said plate in opposition to said spring, a pump casing within said housing on the opposite side of said web from said spring and having a valve, a reciprocable rod parallel to said fixed rod and at one side of said spring and guided in said web for transmitting motion between said plate and said valve, and a piston within said pump casing and connected with said journalled shaft.

JOHN McCLELLAND.